(12) United States Patent
Zapushek

(10) Patent No.: US 6,862,905 B2
(45) Date of Patent: Mar. 8, 2005

(54) PIN LOCKING DEVICE AND METHOD OF LOCKING

(75) Inventor: John B. Zapushek, Racine, WI (US)

(73) Assignee: Master Lock Company, Milwaukee, WI (US)

( * ) Notice: Subject to any disclaimer, the term of this patent is extended or adjusted under 35 U.S.C. 154(b) by 168 days.

(21) Appl. No.: 09/780,536

(22) Filed: Feb. 12, 2001

(65) Prior Publication Data

US 2002/0108407 A1 Aug. 15, 2002

(51) Int. Cl.[7] .............................................. E05B 67/36
(52) U.S. Cl. ................................. 70/34; 70/14; 70/58
(58) Field of Search ............................... 70/14, 18, 34, 70/58

(56) References Cited

U.S. PATENT DOCUMENTS

| | | | |
|---|---|---|---|
| 1,566,473 A | 12/1925 | Gibson | |
| 2,541,638 A | 2/1951 | Clevett | 70/56 |
| 2,677,261 A | 5/1954 | Jacobi | 70/14 |
| 3,197,239 A | 7/1965 | Jezek, Jr. | 280/515 |
| 3,453,846 A | 7/1969 | Owen et al. | 70/54 |
| 3,559,429 A | 2/1971 | Hermann | 70/85 |
| 3,652,114 A | 3/1972 | Cady et al. | 292/281 |
| 3,721,112 A | 3/1973 | Wellekens | 70/39 |
| 3,783,657 A | 1/1974 | Foote | 70/52 |
| 3,843,160 A | 10/1974 | Frushour et al. | 280/415 A |
| 3,902,339 A | 9/1975 | Carley et al. | 70/54 |
| 3,908,415 A | 9/1975 | Foote | 70/49 |
| 3,911,761 A | 10/1975 | Cornellier | 74/527 |
| 3,963,264 A | 6/1976 | Down | 280/415 A |
| 3,999,414 A | 12/1976 | Leitner | 70/379 A |
| 4,141,232 A | 2/1979 | Kelly | 70/54 |
| 4,198,026 A | 4/1980 | Capolupo | 248/552 |
| 4,226,100 A | 10/1980 | Hampton et al. | 70/51 |
| 4,236,395 A | 12/1980 | Avaiusini | 70/34 |
| 4,277,961 A | 7/1981 | Williams | 70/54 |
| 4,298,212 A | 11/1981 | Jamison | 280/515 |
| 4,438,642 A | 3/1984 | De Jong | 70/232 |
| 4,440,005 A | 4/1984 | Bulle | 70/14 |
| 4,576,021 A | 3/1986 | Holden | 70/34 |
| 4,619,122 A | 10/1986 | Simpson | 70/34 |
| 4,637,234 A | 1/1987 | Mielonen | 70/34 |
| 4,711,106 A | 12/1987 | Johnson | 70/34 |
| 4,730,468 A | 3/1988 | Becker | 70/34 |
| 4,888,967 A | 12/1989 | Kuo | 70/52 |

(List continued on next page.)

FOREIGN PATENT DOCUMENTS

| | | |
|---|---|---|
| DE | 2425386 | 4/1975 |
| EP | 0415355 | 8/1990 |
| GB | 1205190 | 9/1970 |
| GB | 2248650 | 4/1992 |
| SU | 1633073 | 3/1991 |

Primary Examiner—Suzanne Dino Barrett
(74) Attorney, Agent, or Firm—Calfee, Halter & Griswold LLP

(57) ABSTRACT

A locking device for locking one or more objects together includes a lock stud defined by an elongated shaft having a head at a first end and an annular recess at a second end, and a lock body that slides over and locks onto the second end. The lock body includes an outer housing having an aperture for receiving the second end of the elongated shaft. A cylinder lock mechanism is positioned in the outer housing, and the cylinder lock is rotatable between a locked and an unlocked position. The cylinder lock is rotationally coupled to a locking disc that is eccentrically disposed in the outer housing with respect to the aperture of the outer housing. The locking disc has an aperture therein that engages the annular recess in the elongated shaft when the cylinder lock is rotated to the locked position. The locking device also includes a sleeve that is dimensioned to slide over the elongated shaft to allow the locking device to be used for locking through several different sized apertures.

19 Claims, 6 Drawing Sheets

U.S. PATENT DOCUMENTS

| | | | |
|---|---|---|---|
| 4,964,285 A | 10/1990 | Lakoski et al. | 70/14 |
| 5,004,133 A | 4/1991 | Wyers | 224/42.45 R |
| 5,022,243 A | 6/1991 | Embry et al. | 70/34 |
| 5,027,630 A | 7/1991 | Stillwagon et al. | 70/391 |
| 5,050,413 A | 9/1991 | Stillwagon et al. | 70/386 |
| 5,063,763 A | 11/1991 | Johnson | 70/58 |
| 5,152,160 A | 10/1992 | Lentini | 70/51 |
| 5,197,314 A | 3/1993 | Stillwagon et al. | 70/386 |
| 5,216,903 A | 6/1993 | Chen | 70/55 |
| 5,269,161 A | 12/1993 | Stillwagon | 70/34 |
| 5,272,894 A | 12/1993 | Stillwagon et al. | 70/208 |
| 5,284,038 A | 2/1994 | Johnson | 70/232 |
| 5,447,045 A | 9/1995 | Cheng | 70/58 |
| 5,467,619 A | 11/1995 | Stillwagon et al. | 70/34 |
| 5,540,065 A | 7/1996 | Wyers | 70/26 |
| 5,664,445 A | 9/1997 | Chang | 70/34 |
| 5,676,258 A | 10/1997 | Leyden et al. | 211/7 |
| 5,794,465 A | 8/1998 | Hill | 70/63 |
| 5,960,653 A * | 10/1999 | DeWalch et al. | 70/34 X |
| 6,055,832 A | 5/2000 | Wyers | 70/34 |
| D428,795 S | 8/2000 | Wyers | D8/7 |
| D439,827 S | 4/2001 | Wyers | D8/7 |
| D444,050 S | 6/2001 | Wyers | D8/7 |
| D447,043 S | 8/2001 | Wyers | D8/7 |
| 6,364,339 B1 * | 4/2002 | Lee | 70/34 X |
| 6,402,181 B1 * | 6/2002 | Lee | 70/34 X |

\* cited by examiner

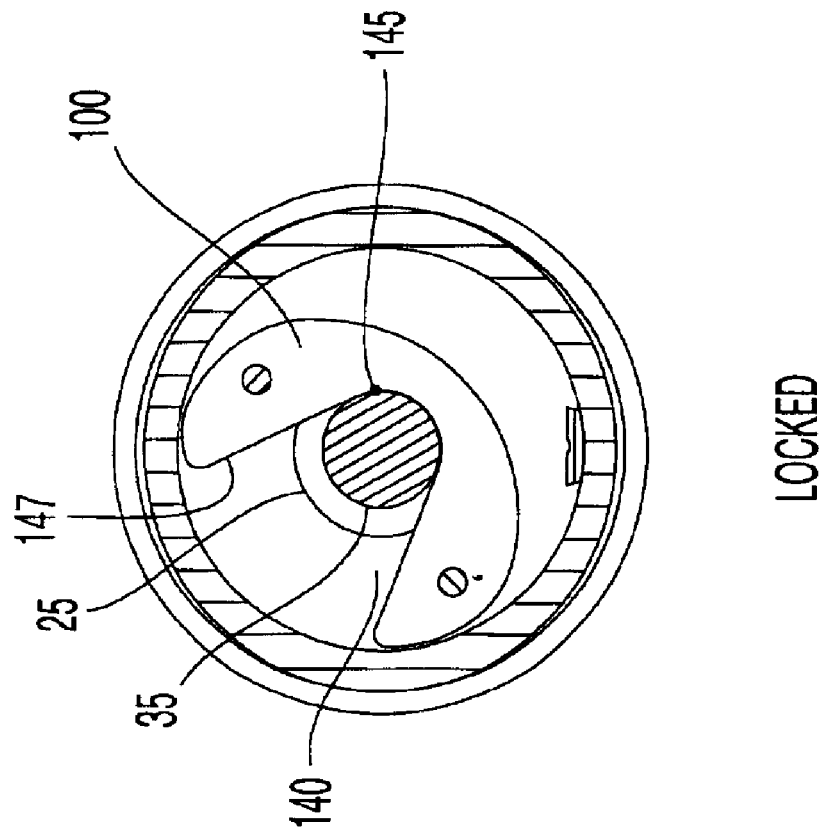
Fig. 5b  LOCKED
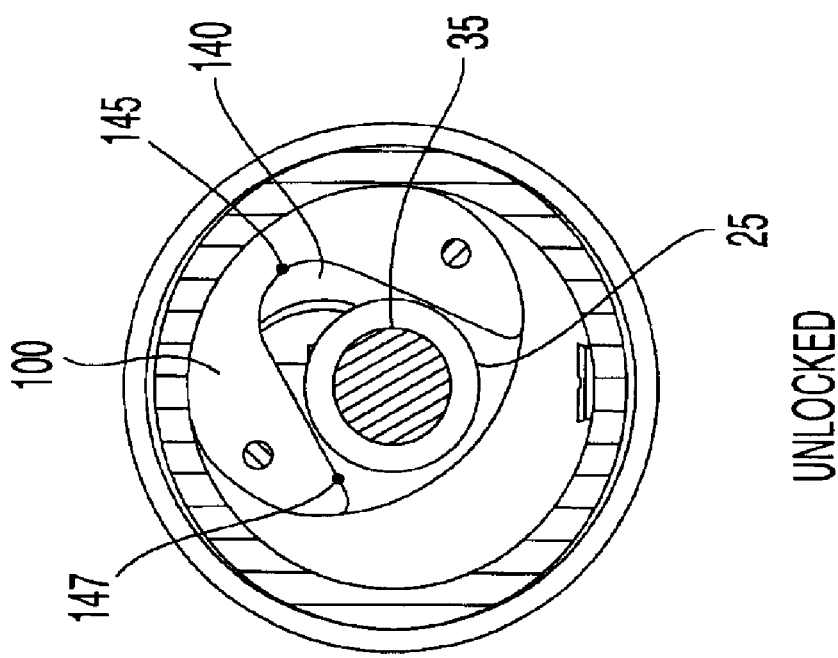
Fig. 5a  UNLOCKED

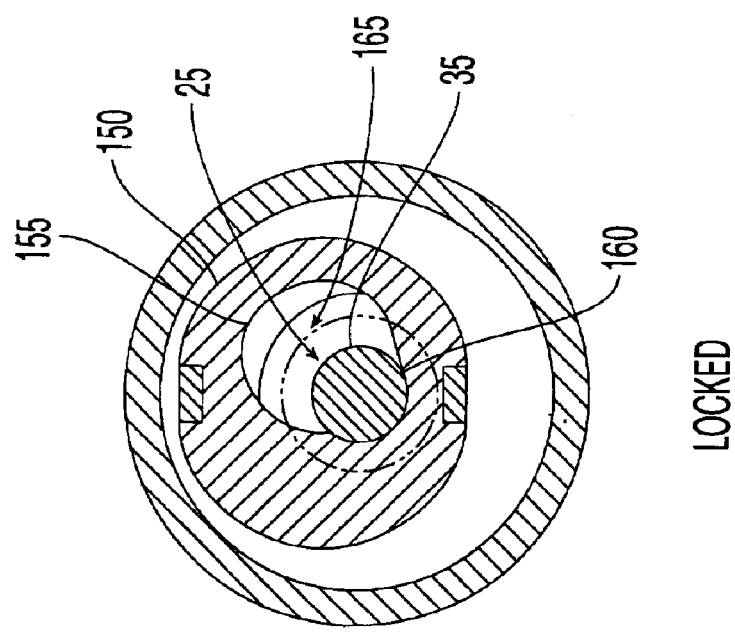
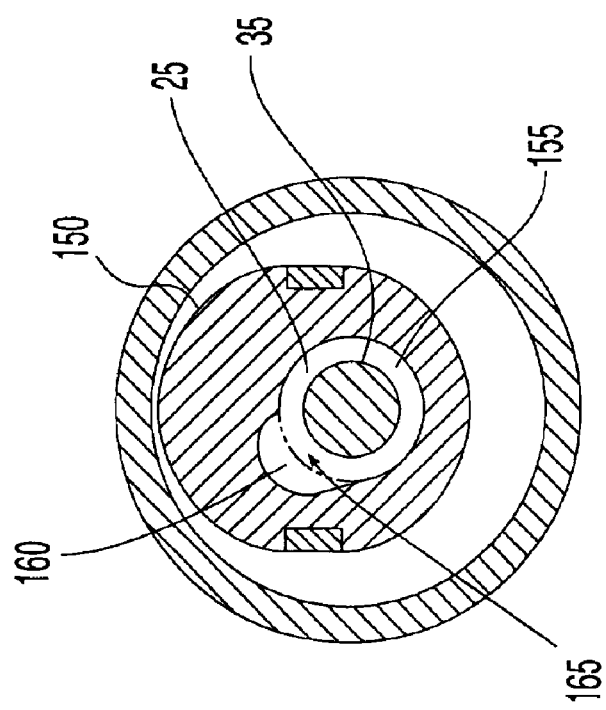

PIN LOCKING DEVICE AND METHOD OF LOCKING

FIELD OF THE INVENTION

This invention relates generally to locking devices. In particular, the present invention relates to a pin locking device that may be used to lock utility hitches for connecting vehicles, or to lock one object to another object such as a spare tire to a motor vehicle.

BACKGROUND OF THE INVENTION

Various types of locking devices have been designed for a multitude of purposes. In the field of utility hitches, U.S. Pat. No. 3,605,457 to Foster and U.S. Pat. No. 3,139,291 to Geresy disclose trailer hitch locking devices that are used to lock a trailer hitch tongue to the ball of a conventional type trailer hitch.

Another type of device, called a pin lock or a coupler lock is generally used for locking together the central hitch member and outer hitch member of telescoping type utility hitches. In this type of utility hitch, the central hitch member fits telescopically into an outer hitch member. Apertures through both hitch members are aligned so that the pin lock can be inserted through the apertures to hold the central hitch member within the outer hitch member. The pin lock is locked onto these members to prevent removal of the pin, so that the vehicle that is connected to the hitch member, such as a trailer, cannot be stolen.

U.S. Pat. No. 5,540,065 to Wyers is an example of such a prior art pin locking device. The disclosed pin locking device includes a rod having a stop at one end and a key-like male portion at its forward tip. A barrel-type combination lock forms an enlarged head and locks over the rod's forward shackle.

U.S. Pat. No. 4,711,106 to Johnson is another example of a prior art pin locking device. The disclosed device includes a stud having a threaded axial hole extending rearwardly from the forward end thereof and a keyed portion. A knob locks over a forward position of the stud and includes a casing with an inner surface that has a keyway. The keyway receives the corresponding key on the stud to prevent rotation of the casing with respect to the stud. The knob also includes a tumbler housing that is mounted in an axially fixed position within the casing to rotate freely when a key is inserted into the tumbler housing, and to remain locked in a fixed position when the key is withdrawn.

Similarly, U.S. Pat. No. 5,284,038 to Johnson discloses a pin locking device that includes a threaded stud with a flat face cut through the threaded surface. The flat face is parallel to the axial direction of the stud. The device also includes a knob that locks over a forward section of the stud and includes a casing having an inner surface that defines a hole extending axially through the casing. The inner surface of the casing has a flat surface extending axially that receives the corresponding flat face on the threaded stud to prevent rotation of the casing with respect to the stud. The knob also includes a tumbler housing that is mounted in an axially-fixed position within the casing to rotate freely when a key is inserted into the tumbler housing, and to remain locked in a fixed position when the key is withdrawn. Fitted into the rearward end of the tumbler housing is a sleeve having a threaded axial hole that engages the threaded stud when the tumbler housing is turned by a key to thereby pull the forward section of the stud into the casing hole.

U.S. Pat. No. 5,197,314 to Stillwagon et al. describes a prior art locking mechanism for a door latch. The mechanism comprises a post and collar gripping and release mechanism cooperatively mounted to the door and the door frame of a vending machine, cabinet, or the like. The mechanism provides an initial latching function in the form of a frictional gripping of the post by the collar. The locking mechanism further comprises a lock assembly associated with the post and collar mechanism to provide a primary locking function and to effect release of the latching function.

SUMMARY OF THE INVENTION

The present invention is directed to a pin lock. The pin lock has a first locking member with a locking end and a second locking member with a first aperture for receiving the locking end. The second locking member includes a locking mechanism positioned inside the outer housing, at least a portion of which is rotatable between a locked position and an unlocked position, and a locking part rotationally coupled with the locking mechanism. The locking part has an axis of rotation which is eccentrically disposed with respect to the longitudinal axis of the first aperture, and the locking part is dimensioned to engage the locking end of the first locking member.

The locking part has a second aperture that is dimensioned to allow passage of the locking end therethrough when the locking mechanism is in the unlocked position. The locking part is further dimensioned to engage the locking end of the first locking member when the locking mechanism is in the locked position.

In one embodiment, the locking part is substantially disc shaped and the second aperture is a substantially wedge-shaped cutout. A portion of the cutout is dimensioned to engage the locking end of the first locking member.

In another embodiment, the locking part is a substantially disc shaped plate having a first through hole and a second through hole overlapping one another. The first through hole is dimensioned to engage a portion of the locking end of the first locking member.

According to one aspect of the present invention, the locking mechanism includes a cylinder shell permanently fixed in the outer housing and a cylinder plug rotatably mounted in the cylinder shell. The locking part is rotationally coupled to the cylinder plug by an extension plate that is keyed to a tail portion of the cylinder plug.

According to another aspect of the present invention, the first locking member has a shaft portion with a knob disposed at the locking end. The first locking member also includes a retaining end including an enlarged portion. Optionally, the lock includes a sleeve dimensioned to slide over a portion of the first locking member.

The present invention is also directed to a method of locking the end of a shaft to a locking mechanism. The method includes providing a shaft with a locking section and providing a locking mechanism dimensioned to receive the locking section of the shaft. The locking mechanism has a first aperture with an axis of rotation and a second aperture with an axis of rotation wherein the axis of the first aperture is eccentrically disposed with respect to the axis of the second aperture. The method further includes rotating the first aperture into alignment with the second aperture, inserting the end of the shaft through the first and second apertures, and rotating the second aperture out of alignment with the first aperture to engage the locking section of the shaft.

According to one aspect of the method, the first aperture is rotated in and out of alignment with the second aperture by inserting a key into the cylinder plug and turning the key.

BRIEF DESCRIPTION OF THE DRAWINGS

Preferred features of the present invention are disclosed in the accompanying drawings, wherein similar reference characters denote similar elements throughout the several views, and wherein:

FIG. 5A is a cross-sectional view of the pin lock of FIG. 4 in an unlocked position, taken along plane V—V;

FIG. 5B is a cross-sectional view of the pin lock of FIG. 4 in a locked position, taken along plane V—V;

FIG. 6A is a cross-sectional view of an alternative embodiment of the pin lock of FIG. 4 in an unlocked position, taken along plane V—V; and FIG. 6B is a cross-sectional view of an alternative embodiment of the pin lock of FIG. 4 in a locked position, taken along plane V—V.

DETAILED DESCRIPTION OF THE PREFERRED EMBODIMENTS

Figure 1:
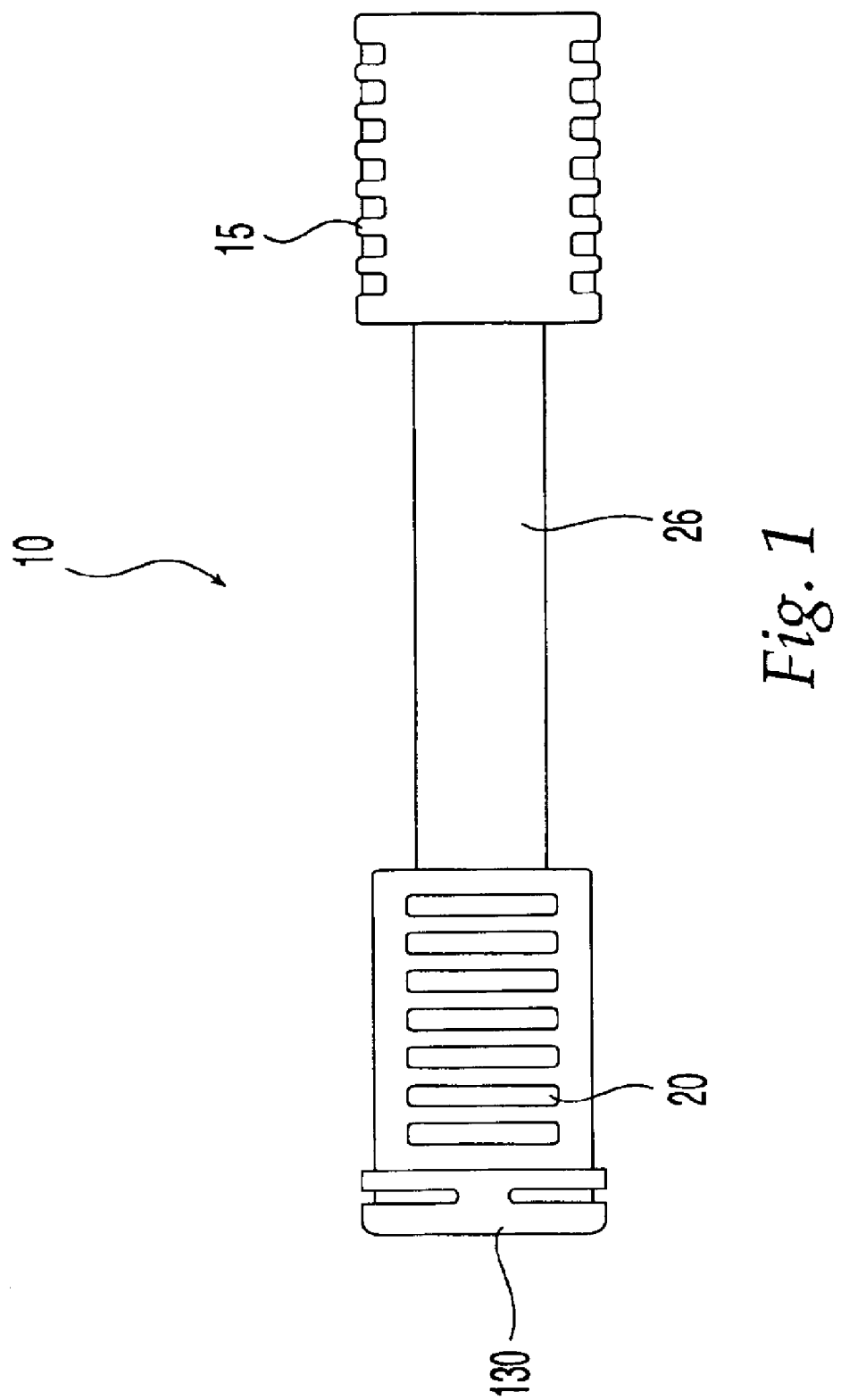
FIG. 1 is a top view of a pin lock according to the present invention.
Figure 2:
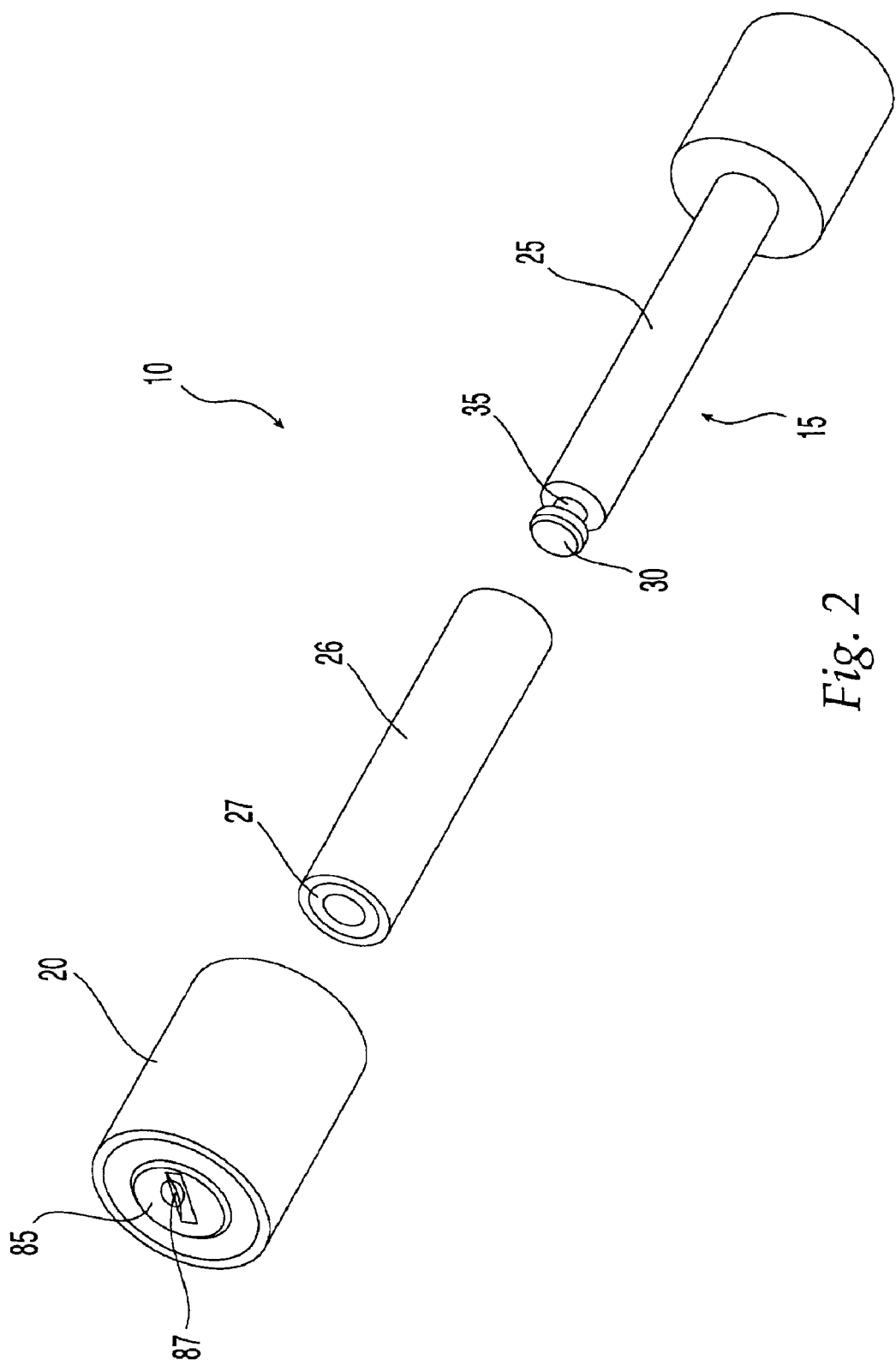
FIG. 2 is an isometric view of the pin lock of FIG. 1 in an unlocked position.
Figure 3:
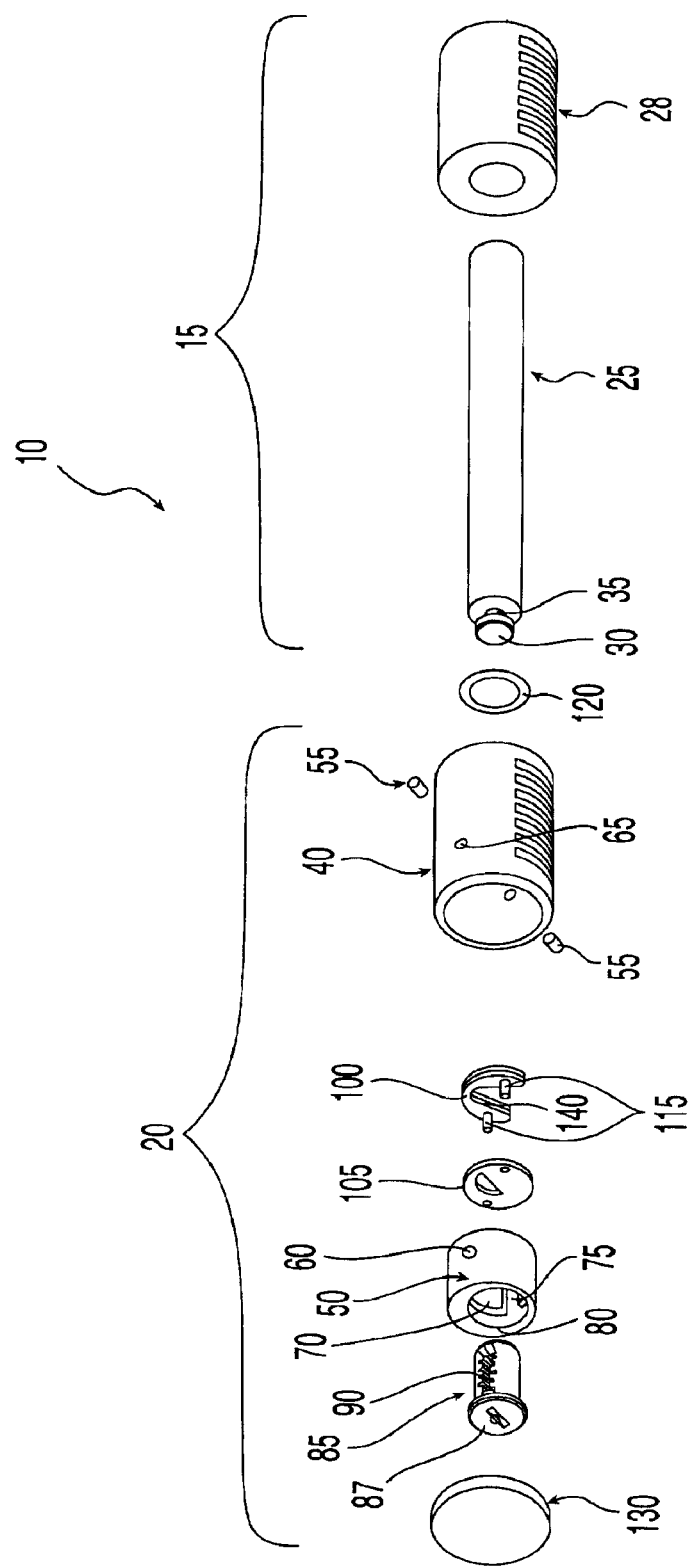
FIG. 3 is an exploded view of the pin lock of FIG. 1.

FIG. 1 is a top view of a pin lock 10 according to the present invention, shown in a locked configuration. FIG. 2 is an isometric view of pin lock 10 in an unlocked configuration. FIG. 3 is an exploded view of the pin lock 10 of FIG. 1. Referring to FIGS. 1 and 2, pin lock 10 includes two lock members, a lock stud 15 and a lock body 20. Lock body 20 slides over an elongated shaft 25 of stud 15 and can be locked thereon by a lock mechanism that is shown in detail in FIG. 3. Optionally, pin lock 10 includes a sleeve 26 that is dimensioned to slide over elongated shaft 25, thus allowing the pin lock 10 to be used for locking together parts that have apertures of various sizes. Sleeve 26 can include a retaining ring 27 disposed within its inner diameter to hold sleeve 26 on elongated shaft 25. Retaining ring can be formed of plastic, rubber or other suitable materials and can extend either partially or entirely along the length of sleeve 26.

Referring to FIG. 3, lock stud 15 includes an enlarged head 28 that is permanently attached to an elongated shaft 25 by welding or other means of attachment known in the art, such as pinning. Alternatively, other retaining members may be used, such as a bend or deformation in the elongated shaft 25 sufficient to prevent it from passing through a hole of slightly larger diameter than shaft 25. In another embodiment, shaft 25 and elongated head 28 can be a single piece machined from metal or other suitable materials known in the art.

Elongated shaft 25 has a knob 30 at its opposite end, the knob 30 being formed by an annular recess 35 proximate the end of the shaft 25. Alternatively, shaft 25 may have a section of increased diameter at its end (not shown), such as a knob or other appendage. In one embodiment, elongated shaft 25 is constructed of about ½ inch diameter solid steel, but other materials such as titanium or aluminum may be suitable as well. Also, elongated shaft 25 can be made in many different lengths and diameters that are suitable for different applications.

Still referring to FIG. 3, lock body 20 includes a hollow outer housing 40 that has an aperture 45 therein (shown in FIG. 4) that is dimensioned to receive the locking end of elongated shaft 25, having knob 30 thereon. A cylinder shell 50 is positioned in the outer housing 40. In a preferred embodiment, cylinder shell 50 is permanently fixed inside outer housing 40 by retaining pins 55, which extend out of holes 60 in the cylinder shell 50 and through holes 65 in the outer housing 40. Other methods of attachment, such as welding or bonding, may also be used to fix cylinder shell 50 into the outer housing 40, the method of attachment not being critical to the invention.

An interior cavity 70 extends axially through cylinder shell 50. The interior cavity 70 is preferably located eccentrically with respect to the longitudinal axis of the cylinder shell 50. Interior cavity 70 is generally cylindrical and has a pair of passageways 75 therein. Passageways 75 are positioned on opposite sides of the diameter of interior cavity 70.

A key-operated cylinder plug 85, of the type well known in the art, is turnable in interior cavity 70. Cylinder plug 85 has a keyhole 87 and a key slot (not shown) for receiving a key. Several radially extending tumblers 90 (shown in FIG. 4) extend into the key slot at one end, and into passageways 75 in the interior cavity 70 at the other end. When no key is inserted into the key receiving slot, the extended tumblers 90 prevent rotation of the cylinder plug 85 in the interior cavity 70. However, when a matching key is inserted into the slot, the tumblers 90 retract into the cylinder plug 85, thus allowing the cylinder plug 85 to rotate in the interior cavity 70. Suitable alternatives well known in the art, such as wafers or pins, may be used instead of tumblers 90.

A locking part 100, also referred to as locking disc 100, is coupled to the cylinder plug 85 by extension plate 105. Locking disc 100 is constructed of metal. In one embodiment, locking disc 100 is constructed of two identical pieces of metal that are fastened together, however any number of constructions may be suitable for the locking disc 100. In a preferred embodiment, the locking disc 100 is two identical pieces of stamped steel plate.

Extension plate 105 is preferably a stamped part that is keyed to fit on the plug tail 110 (shown in FIG. 4) of the cylinder plug 85. The extension plate 105 and the locking disc 100 are held together by two posts 115, which are swaged holding the locking disc 100 and the extension plate 105 together in spatial relation. Alternatively, the parts may be held together by other means well known in the art, such as welding or bonding. In another embodiment, locking disc 100, extension plate 105 and posts 115 are a single piece formed by casting, stamping or other methods known in the art. Extension plate 105 rigidly couples cylinder plug 85 and locking disc 100, so that the two parts are rotationally coupled.

Figure 4:
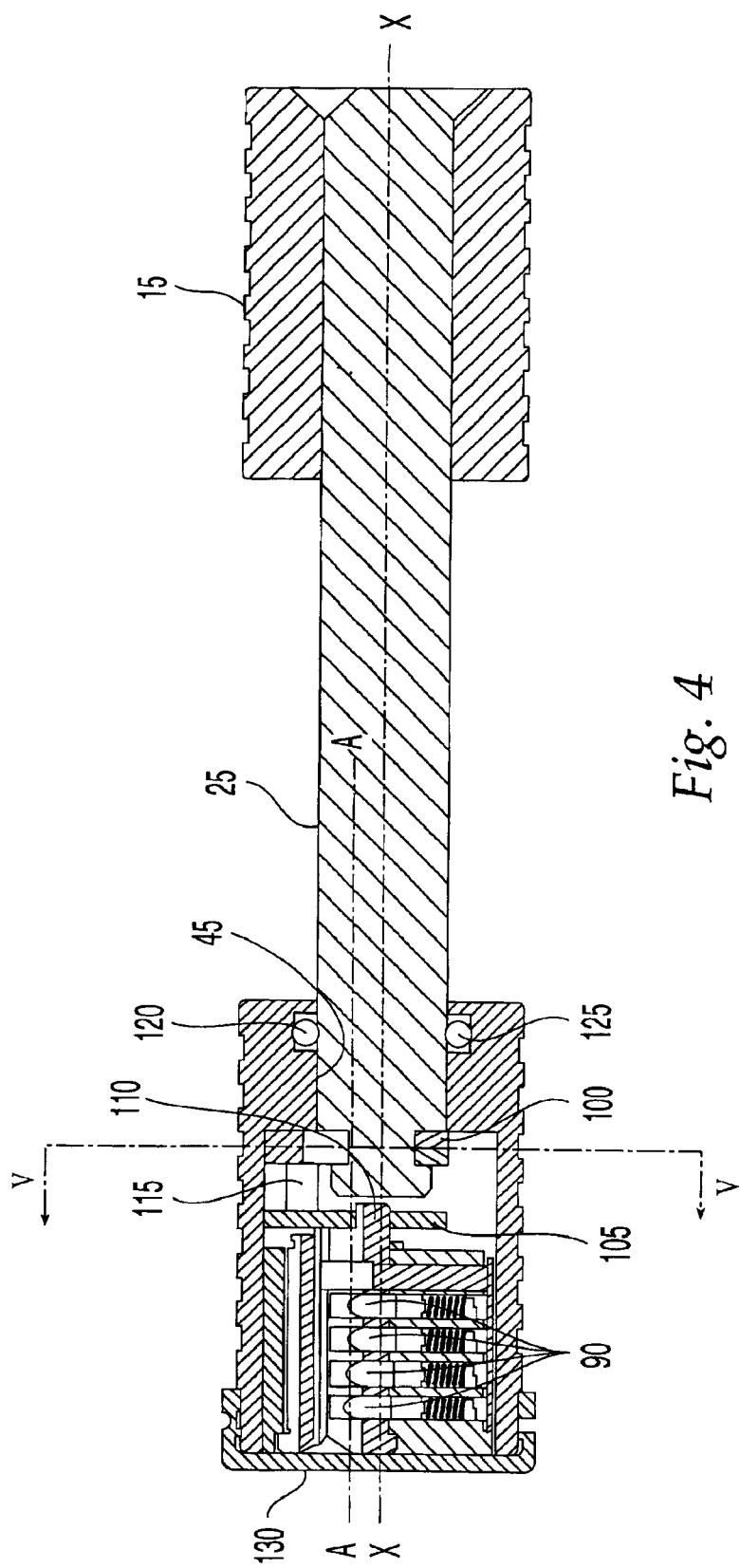
FIG. 4 is a cross-sectional view of the pin lock of FIG. 1

As shown in FIG. 4, a rubber O-ring seal 120 sits in a cylindrical pocket 125 in the aperture 45 in the outer housing 40, and a cap 130 snaps over the end of the outer housing 40. The O-ring seal 120 and the cap 130 work in conjunction to seal the outer housing 40 from dirt and water.

Referring to FIGS. 5A and 5B, the locking disc 100 of one embodiment of the invention is shown in detail. The disc 100 has a locking aperture 140 therein, preferably in the shape of a "V". The aperture 140 has an engaging portion 145 that is dimensioned to lock into a portion of the annular recess 35 in shaft 25. The non-engaging portion 147 of the aperture 140 is wider than the engaging portion 145 and is dimensioned to allow the shaft 25 to pass through the non-engaging portion 147 without contact. The axis of rotation of the disc 100 and the center of aperture 45 in the outer housing 40 are eccentrically aligned. This eccentric alignment causes the locking aperture 140 in the disc 100 to rotate between the locked position (FIG. 5B) and the unlocked position (FIG. 5A) when the key (not shown) is turned 90° in the cylinder plug 85. When in the locked position (FIG. 5B), engaging portion 145 of the locking aperture 140 enters annular recess 35 in shaft 25 and engages knob 30. When in the unlocked position (FIG. 5A), engaging portion 145 is displaced from shaft 25 and allows shaft 25 to pass freely through non-engaging portion 147. Thus, the relationship between aperture 45 in the outer housing 40 and locking disc 100 provides the locking/unlocking function of the pin lock 10.

FIGS. 6A and 6B show an alternate embodiment of a locking disc 150. In this embodiment, locking disc 150 has two eccentric holes 155, 160 cut through it. Non-engaging hole 155 is dimensioned to allow shaft 25 to freely pass there through, while engaging hole 160 is dimensioned to lock into annular recess 35 in shaft 25. The two eccentric holes 155, 160 overlap to form a locking aperture 165 in locking disc 150. Similar to the embodiment discussed above, disc 150 has a rotational axis A—A that is eccentric with respect to the longitudinal axis X—X of aperture 45 in the outer housing 40, as shown in FIG. 4. Longitudinal axis X—X of aperture 45 corresponds to the longitudinal axis of pin lock 10. Thus, a 90° rotation of the cylinder plug 85, by way of a matching key, rotates the disc 150 between the locked position (FIG. 6B) and the unlocked position (FIG. 6A). When in the locked position (FIG. 6B), engaging hole 160 enters annular recess 35 in shaft 25 and engages knob 30. When in the unlocked position (FIG. 6A), engaging hole 160 is displaced from shaft 25 and allows shaft 25 to pass freely through non-engaging hole 155. Many other configurations for the locking disc may also be acceptable, such as a disc with a circular, rectangular or bean-shaped aperture, among other shapes. Also, the disc and aperture may be modified to provide a variety of angles of rotation between the locked and unlocked positions, such as 60° or 120°, for example.

To use the pin lock 10 to lock items together, a user must first insert a matching key into the cylinder plug 85 by way of the keyhole 87 and turn the key 90° to the open position. Turning the key to the open position rotates the cylinder plug 90 and ultimately the locking disc 100 so that the non-engaging portion 147 of the locking aperture 140 is aligned with the aperture 45 in the outer housing 40.

Next, the user inserts the locking end of shaft 25 with the knob 30 through openings in the items to be locked, such as through the hole of a receiver and trailer hitch ball assembly, and then into the aperture 45 in outer housing 40.

Finally, the user turns the key 90° back to the locked position and removes the key. This rotates the engaging portion 145 of the locking aperture 165 into alignment with the aperture 45 in the outer housing 40, and thereby engages the engaging portion 145 with the annular recess 35 in shaft 25. The knob 30 prevents the shaft 25 from being removed from the lock body 20.

To unlock the pin lock, the user inserts the key into the cylinder plug 85 and turns it 90° to the open position. This rotates the engaging portion 145 of the locking aperture 140 out of engagement with the annular recess 35 and allows the shaft 25 to be freely removed from the aperture 45 in the outer housing 40. In this manner, the stud 15 is completely separated from the lock body 20, and the items that were locked together can now be separated from one another.

It should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. Accordingly, the scope of the present invention is to be defined as set forth in the appended claims.

What is claimed is:

1. A method of locking an end of a shaft to a locking mechanism, comprising:

providing a shaft with a locking position;

providing a locking mechanism dimensioned to receive a portion of a locking section of a shaft and having a first aperture with an axis of rotation and a second aperture with an axis of rotation wherein the axis of the first aperture is eccentrically disposed with respect to the axis of the second aperture;

rotating said first aperture into alignment with said second aperture;

inserting an end of a shaft through said first aperture and said second aperture;

rotating said second aperture out of alignment with said first aperture and thereby engaging a locking section of a shaft.

2. The method of claim 1, wherein rotating said first aperture into alignment with said second aperture further comprises inserting a key into a cylinder plug rotationally coupled to said first aperture and turning said key toward an unlocked position.

3. The method of claim 2, wherein rotating said second aperture out of alignment with said first aperture comprises turning said key to a locked position.

4. A pin lock comprising:

(a) first locking member having a locking end; and (b) a second locking member, including:

(i) an outer housing having a first aperture dimensioned for receiving at least a portion of said locking end of said first locking member, said first aperture having a longitudinal axis;

(ii) a locking mechanism positioned inside said outer housing, at least a portion of which is rotatable between a locked position and an unlocked position;

(iii) a locking part rotationally coupled with said portion of said locking mechanism and having an axis of rotation eccentrically disposed with respect to said longitudinal axis of said first aperture, said locking part dimensioned to interact with at least a portion of said locking end of said first locking member;

(c) a sleeve dimensioned to slide over at least a portion of said first locking member; and (d) a retaining ring disposed within the sleeve.

5. A pin lock comprising:

(a) a first locking member having a locking end; and (b) a second locking member, including:

(i) an outer housing having a first aperture dimensioned for receiving at least a portion of said locking end of said first locking member, said first aperture having a longitudinal axis;

(ii) a locking mechanism positioned inside said outer housing, at least a portion of which is rotatable between a locked position and an unlocked position; and (iii) a locking part rotationally coupled with said portion of said locking mechanism and having an axis of rotation eccentrically disposed with respect to said longitudinal axis of said first aperture, said locking part dimensioned to interact with at least a portion of said locking end of said first locking member, wherein said locking part has a second aperture dimensioned to allow passage of said locking end through said second aperture when said locking mechanism is in said unlocked position and to engage said locking end of said first locking member when said locking member is in said locked position.

6. The pin lock of claim 5, wherein said locking part is substantially disc shaped and the locking part aperture is a substantially wedge-shaped cutout, at least a portion of said cutout being dimensioned to engage at least a portion of said locking end of said first locking member.

7. The lock of claim 5, wherein said locking part is a substantially disc shaped plate having a first through hole and a second through hole overlapping said first through hole, wherein said first through hole defines a first axis and said second through hole defines a second axis with said first axis being eccentrically disposed with respect to said second axis, wherein said first through hole is dimensioned to engage at least a portion of said locking end of said first locking member.

8. The pin of claim 7, wherein said first axis is aligned with the first aperture longitudinal axis when said locking mechanism is in said unlocked position.

9. The pin lock of claim 5, wherein said locking mechanism rotatable portion includes a cylinder shell permanently fixed in said outer housing and a cylinder plug rotatably mounted in said cylinder shell.

10. The pin lock of claim 9, wherein said locking mechanism rotatable portion further comprises an extension plate having a keyway and at least one pin extending therefrom and said cylinder plug includes a tail portion, and said locking part is rotationally coupled with said cylinder plug by said extension plate, said keyway is associated with said tail portion of said cylinder plug, and said at least one pin extends from said extension plate and rigidly attaches said extension plate to said locking part.

11. The pin lock of claim 5, wherein said first locking member includes a shaft having a knob at said locking end, said knob defined by an annular recess in said shaft.

12. The pin lock of claim 5, wherein said first locking member further comprises a retaining end including an enlarged portion.

13. The pin lock of claim 5, further comprising a sleeve dimensioned to slide over at least a portion of said first locking member.

14. A lock for a shall having a tip with a locking section, said lock comprising:
(a) an outer housing having a first aperture dimensioned for receiving at least a portion of a locking section of a shaft, said first aperture having a longitudinal axis;
(b) a locking mechanism located inside said outer housing and rotatable between a locked position and an unlocked position; and
(c) a locking part rotationally coupled with said locking mechanism and having an axis of rotation eccentrically disposed with respect to said longitudinal axis of said first aperture, said locking part dimensioned to interact with at least a portion of a locking section of a shaft, wherein said locking part has a second aperture dimensioned to allow passage of at least a portion of a locking section of a shaft through the locking part aperture when said locking mechanism is in said unlocked position, and dimensioned to engage at least a portion of a locking section of a shaft when said locking mechanism is in said locked position.

15. The lock of claim 14, wherein said locking part aperture is substantially wedge-shaped, and a portion of said locking part aperture is dimensioned to engage at least part of a locking section of a shaft.

16. The lock of claim 14, wherein said locking part aperture includes a first through hole and a second through hole overlapping said first through hole, wherein said first through hole defines a first axis that is eccentrically disposed with respect to a second axis defined by said second through hole, said first through hole is dimensioned to engage at least a portion of a locking section of a shaft.

17. The lock claim 14, wherein said locking mechanism comprises a cylinder shell positioned inside said outer housing and a cylinder plug rotatably mounted in said cylinder shell.

18. The lock of claim 17, wherein said cylinder shell is permanently fixed inside said outer housing.

19. The lock of claim 18, wherein said locking mechanism further comprises an extension plate having a keyway and at least one pin extending therefrom and said cylinder plug includes a tail portion, and said locking part is rotationally coupled with said cylinder plug by said extension plate, said keyway is associated with said tail portion of said cylinder plug, and said at least one pin extends from said extension plate and rigidly attaches said extension plate to said locking part.

\* \* \* \* \*